A. GROHMANN.
Cultivator.

No. 88,034.

Patented March 23, 1869.

WITNESSES:

INVENTOR:

ANTHONY GROHMANN, OF SOUTH SAGINAW, MICHIGAN.

Letters Patent No. 88,034, dated March 23, 1869.

IMPROVEMENT IN CULTIVATORS.

The Schedule referred to in these Letters Patent and making part of the same.

*To whom it may concern:*

Be it known that I, ANTHONY GROHMANN, of South Saginaw, in the county of Saginaw and State of Michigan, have invented a new and useful Improvement in Scarifiers, Cultivators, and Cutters combined; and I do declare that the following is a true and accurate description thereof, reference being had to the accompanying drawings, and to the letters of reference marked thereon, and being a part of this specification.

Like letters indicate like parts in each figure.

Figure 1:
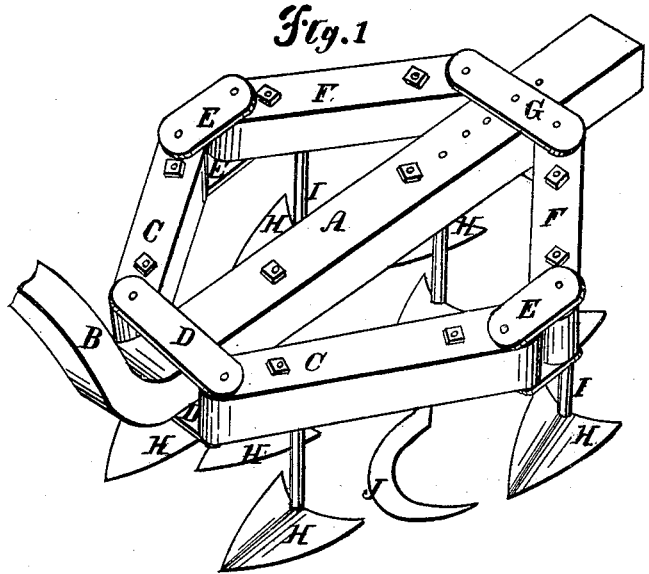
Figure 1 is a perspective view of my invention, opened, or expanded.

The nature of my invention consists in peculiar-shaped cutters, attached to a garden-cultivator, which are intended to cut vines and runners trailing on the ground.

A, in the drawings, is a centre-beam, to which the tongue B is secured.

The side-beams C are pivoted to plates D, which are rigidly secured to the centre-beam A.

The opposite ends of these side-beams C are pivoted, by means of plates E, to other side-beams, F, whose rear ends are, in turn, pivoted to the plates G, which slide, one above and the other below the rear end of the centre-beam.

These plates G have suitable holes punched through them, corresponding to a series of similar holes through the centre-beam, by means of which, and a suitable pin, the side-beams may be held in any desired position relative to the centre-beam.

To the under side of these beams are secured the steel teeth, or scarifiers H, made in the usual form, their upper surfaces being slightly concave.

These teeth, or scarifiers, are provided with iron shanks, I, by means of which they are bolted to the before-described beams, in such relative position to each other, that the point of one of the teeth will be in line with the termination of the wing of the tooth preceding it.

Cutters, J, are attached, by suitable bolts, to the side-beams C, in the rear of and in line with the termination of the wings of the front teeth, and are designed for cutting the runners of vines.

Figure 2:
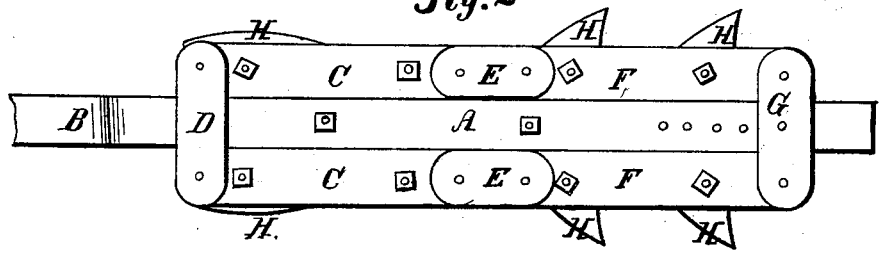
Figure 2 is a plan view of the same closed.

This implement may be expanded to any desired width, as shown in fig. 1, or closed until the side-beams are horizontal with the centre-beam, as shown in fig. 2.

The number of teeth used should be governed by the distance the frame is expanded. The position of the teeth should be changed also, which is readily done by loosening the nuts which hold them in place, changing the direction of the point as desired, and tightening the bolts again.

The cutters may be removed at any time their services are not needed, and, by the construction of an implement as herein described, perfect adjustability to any desired width can be obtained This device is peculiarly adapted to the cultivation of gardens, for weeding-purposes.

What I claim as my invention, and desire to secure by Letters Patent, is—

The implement described, having the sickle-back cutters J, in combination with the adjustable beams C and F, and centre-beam A, as described, for the purpose set forth.

ANTHONY GROHMANN.

Witnesses:
L. C. HYDE,
CHARLES A. W. RICE.